(12) United States Patent
Hong

(10) Patent No.: US 7,567,322 B2
(45) Date of Patent: Jul. 28, 2009

(54) LIQUID CRYSTAL DISPLAY DEVICE

(75) Inventor: Hyung-Ki Hong, Seoul (KR)

(73) Assignee: LG Display Co., Ltd., Seoul (KR)

( * ) Notice: Subject to any disclaimer, the term of this patent is extended or adjusted under 35 U.S.C. 154(b) by 356 days.

(21) Appl. No.: 11/633,494

(22) Filed: Dec. 5, 2006

(65) Prior Publication Data

US 2007/0153187 A1   Jul. 5, 2007

(30) Foreign Application Priority Data

Dec. 30, 2005   (KR) .................. 10-2005-0135612

(51) Int. Cl.
*G02F 1/1337*   (2006.01)
(52) U.S. Cl. ...................... 349/129; 349/114
(58) Field of Classification Search ............... 349/129, 349/114, 43, 130, 138, 42
See application file for complete search history.

(56) References Cited

U.S. PATENT DOCUMENTS 6,967,702 B2 *  11/2005  Ishii et al. ................ 349/123

2005/0237455 A1 *  10/2005  Fujioka et al. .............. 349/114

FOREIGN PATENT DOCUMENTS

| CN | 1397829 | 2/2003 |
|---|---|---|
| CN | 1538227 | 10/2004 |
| CN | 1573428 | 2/2005 |

\* cited by examiner

*Primary Examiner*—Thoi V Duong
(74) *Attorney, Agent, or Firm*—McKenna Long & Aldridge LLP

(57) ABSTRACT

A liquid crystal display device comprises first and second substrates facing each other and including a plurality of pixel regions, each of the plurality of pixel regions including transmissive and reflective areas; a plurality of first electric field distorting units repeatedly arranged in the transmissive area, wherein each of the plurality of first electric field distorting units generates a first domain structure; a plurality of second electric field distorting units repeatedly arranged in the reflective area, wherein each of the plurality of second electric field distorting units generates a second domain structure having less domains than the first domain structure; and a liquid crystal layer interposed between the first and second substrates.

14 Claims, 6 Drawing Sheets

LIQUID CRYSTAL DISPLAY DEVICE

This application claims the benefit of Korean Patent Application No. 2005-0135612, filed on Dec. 30, 2005, which is hereby incorporated by reference for all purposes as if fully set forth herein.

BACKGROUND OF THE INVENTION

1. Field of the Invention

The present invention relates to a liquid crystal display (LCD) device. More particularly, the present invention relates to a vertical alignment (VA) mode liquid crystal display device.

2. Discussion of the Related Art

The liquid crystal molecules for a LCD device have orientation characteristics of arrangement resulting from their thin and long shape. An arrangement direction of the liquid crystal molecules can be controlled by applying an electrical field to them. Thus, the LCD device displays images using a variation of transmittance of the liquid crystal molecules by controlling magnitudes of the electric field. The LCD device includes a thin film transistor (TFT) as a switching element, referred to as an active matrix LCD (AM-LCD) device, and has excellent characteristics of high resolution and displaying moving images.

A related art LCD device includes a first substrate, a second substrate and a liquid crystal layer. The first substrate includes a pixel electrode, and the second substrate includes a color filter layer and a common electrode. The first and second substrates face each other, and the liquid crystal layer is interposed therebetween. The related art LCD device displays images using a vertical electric field between the pixel and common electrodes. The LCD device using the vertical electric field has a high transmittance and a high aperture ratio. However, the LCD device has problems such as narrow viewing angle, and low contrast ratio.

To resolve the above-mentioned problems, the VA mode LCD device having a wide viewing angle is suggested.

FIG. 1 is a cross-sectional view of a VA mode LCD device according to the related art. As shown in FIG. 1, the VA mode LCD device includes first and second substrates 10 and 20 and the liquid crystal layer 30 therebetween. The pixel and common electrodes 12 and 24 are formed on the first and second substrates 10 and 20, respectively. The pixel and common electrodes 12 and 24 include a pixel electrode rib 12a and a common electrode rib 24a, respectively. When different voltages are applied to the pixel and common electrodes 12 and 24, the electric field 50 between the pixel and common electrodes 12 and 24 is distorted by the pixel electrode rib 12a and the common electrode rib 24a such that first and second oblique electric field 50a and 50b are induced. Thus, the liquid crystal layer 30 has two domains such that the viewing angle is improved and the VA mode LCD device has a wide viewing angle.

One of the pixel electrode ribs 12a and the common electrode ribs 24a may be omitted. Moreover, the pixel electrode 12 and the common electrode 24 may have a slit instead of the pixel electrode rib 12a and the common electrode rib 24a.

The related art LCD device includes a backlight assembly on an outer surface of the second substrate as a light source. The LCD device including the backlight assembly may be referred to as a transmissive type LCD device. Displayed images have light between 3% and 8% of original light emitted from the backlight assembly in the transmissive type LCD device. Accordingly, to display images of high luminance, there is a problem of power consumption in the backlight assembly.

To resolve the problem in the transmissive type LCD device, a reflective type LCD device, which does not include the backlight assembly as the light source, is suggested. The reflective type LCD device includes a reflective electrode instead of the pixel electrode. The pixel electrode has a transparent property in the transmissive type LCD device, but the reflective electrode has a reflective property in the reflective type LCD device. The reflective electrode reflects outside light or artificial light. Unfortunately, there may be circumstances in which the outside light and the artificial light may not exist such that the reflective type LCD device does not display images in the dark.

To resolve these problems of the transmissive type LCD device and the reflective type LCD device, a transflective type LCD device having advantages of the transmissive type LCD device and the reflective type LCD device is suggested. The transflective type LCD device includes a transmissive area and a reflective area in the pixel region to convert between the transmissive mode and the reflective mode depending on the surroundings.

Moreover, to improve the viewing angle of the transflective type LCD device, the VA mode LCD device is incorporated into the transflective type LCD device. It may be referred to as a transflective VA mode LCD device. Since the transflective VA mode LCD device uses outside light, luminance of the images may be decrease. Moreover, when the transflective VA mode LCD device has multiple domains to improve the viewing angle, luminance further decreases because of area occupied by a disclination between domains.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device including transmissive and reflective areas that have multiple domains to improve a viewing angle and aperture ratio.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device comprises first and second substrates facing each other and including a plurality of pixel regions, each of the plurality of pixel regions including transmissive and reflective areas; a plurality of first electric field distorting units repeatedly arranged in the transmissive area, wherein each of the plurality of first electric field distorting units generates a first domain structure; a plurality of second electric field distorting units repeatedly arranged in the reflective area, wherein each of the plurality of second electric field distorting units generates a second domain structure having less domains than the first domain structure; and a liquid crystal layer interposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to embodiments of the present invention, examples of which are illustrated in the accompanying drawings.

Figure 1:
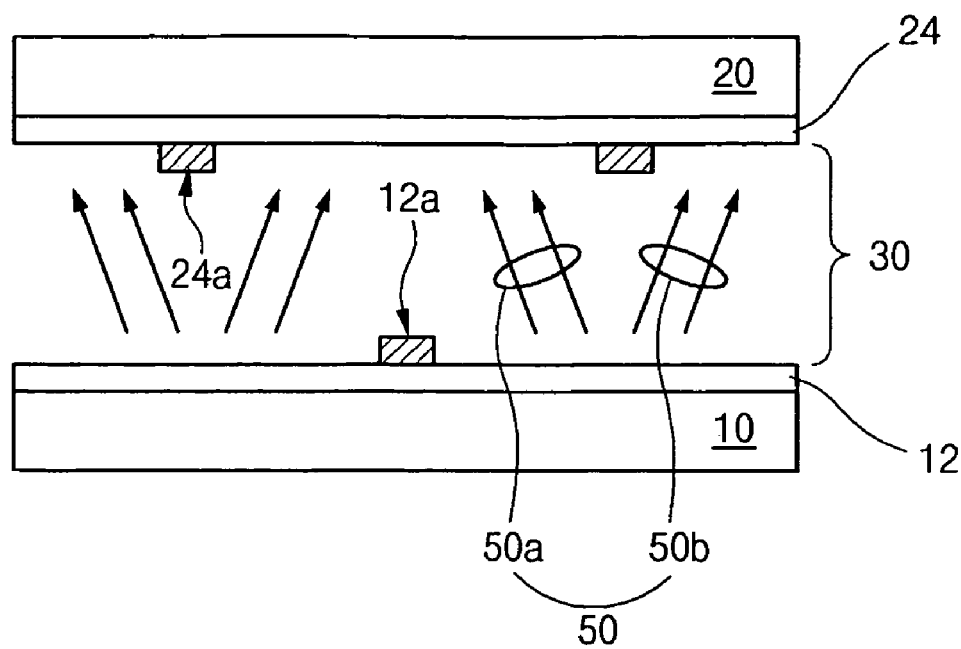
FIG. 1 is a cross-sectional view of a VA mode LCD device according to the related art.
Figure 2:
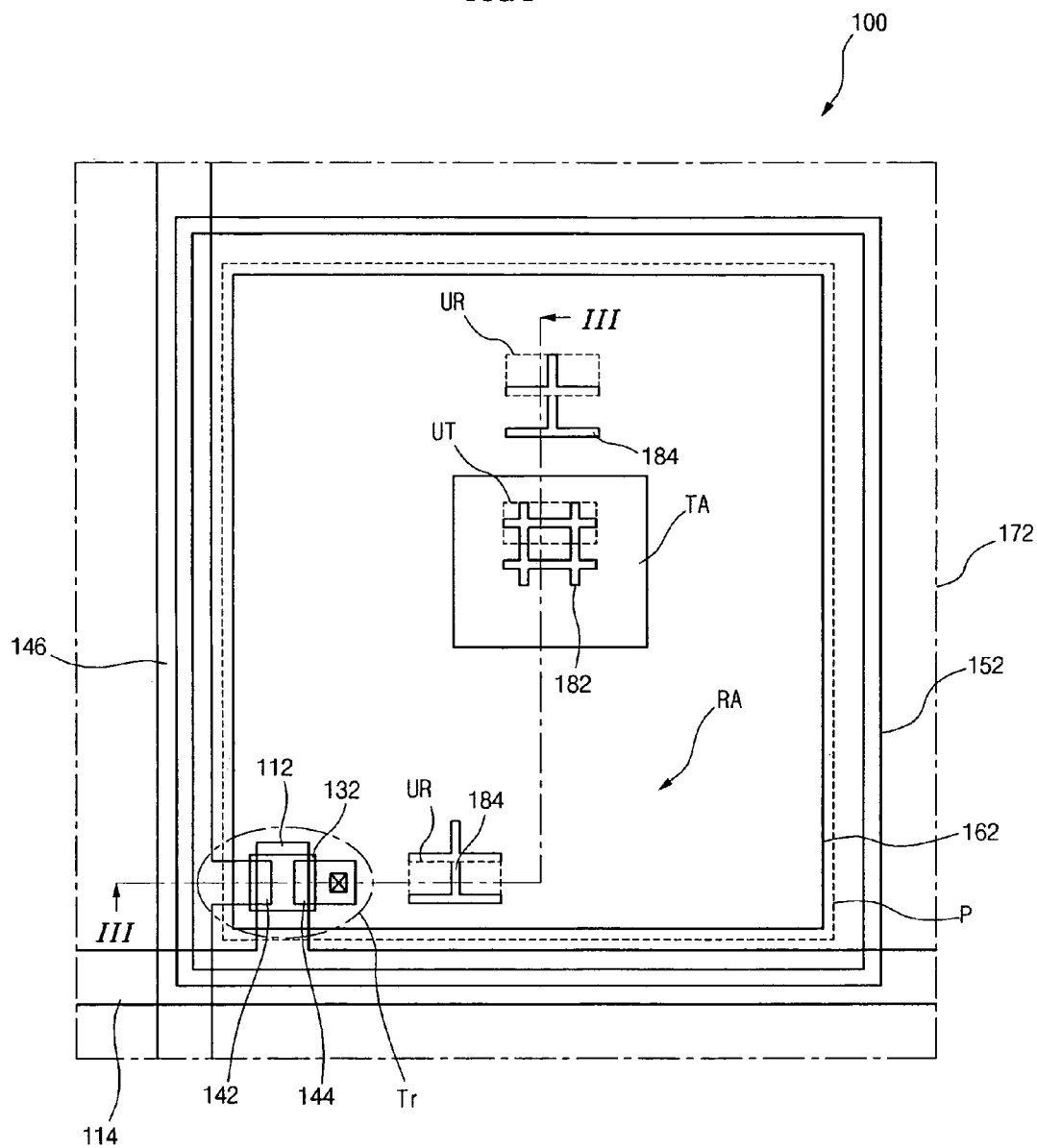
FIG. 2 is a plan view of a transflective VA mode LCD device according to the present invention.
Figure 3:
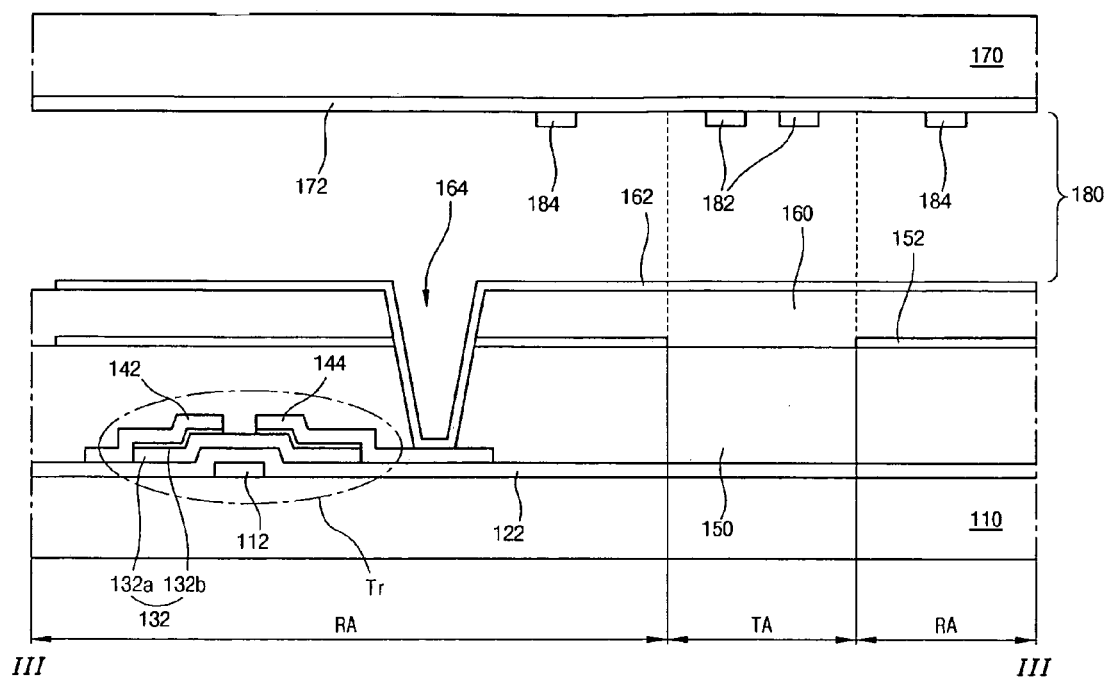
FIG. 3 is a cross-sectional view taken along the line III-III of FIG. 2.

FIG. 2 is a plan view of a transflective VA mode LCD device according to the present invention, and FIG. 3 is a cross-sectional view taken along the line III-III of FIG. 2.

As shown in FIGS. 2 and 3, the transflective VA mode LCD device 100 includes first and second substrates 110 and 170 facing each other and a liquid crystal layer 180 interposed therebetween. A gate line 114 and a gate electrode 112 extending from the gate line 114 are formed on the first substrate 110. A gate insulating layer 122 is formed on the gate electrode 112, and a semiconductor layer 132 including an active layer 132a of intrinsic amorphous silicon and an ohmic contact layer 132b of impurity-doped amorphous silicon is formed on the gate insulating layer 122. Source and drain electrodes 142 and 144 separated from each other are formed on the semiconductor layer 132. A data line 146, which extends from the source electrode 142 and crosses the gate line 114 to define a pixel region P, is formed on the gate insulating layer 122. The pixel region P includes a transmissive area TA and a reflective area RA surrounding the transmissive area TA. The gate electrode 112, the semiconductor layer 132 and the source and drain electrodes 142 and 144 form a thin film transistor (TFT) Tr.

A first passivation layer 150 is formed on the TFT Tr and the data line 146, and a reflector 152 corresponding to the reflective area RA is formed on the first passivation layer 150. A second passivation layer 160 is formed on the reflector 152, and a pixel electrode 162, which is formed of a transparent conductive material and corresponds to the pixel region P, is formed on the second passivation layer 160. A drain contact hole 164, which exposes the drain electrode 144, is formed on the first passvation layer 150, the reflector 152 and the second passivation layer 160 such that the pixel electrode 162 contacts the drain electrode 144 through the drain contact hole 164. The reflector 152 may be connected to the pixel electrode 162 such that the reflector 152 functions as an electrode driving the liquid crystal layer 180. In other words, when the reflector 152 is not connected to the pixel electrode 162, the reflector 152 functions as a reflector. An order of the first and second passvation layers 150 and 160, the reflector 152 and the pixel electrode 162 may be variable.

A common electrode 172 is formed on the second substrate 170. An electric field induced between the pixel electrode 162 and the common electrode 172 drives the liquid crystal layer 180. As mentioned above, the reflector 152 is connected to the pixel electrode 162, the electric field is also induced between the reflector 152 and the common electrode 172.

The second substrate 172 may include a plurality of first ribs 182 and a plurality of second ribs 184 on the common electrode 172 to have multiple domains for improving the viewing angle. The plurality of first ribs 182 crossing each other correspond to the transmissive area TA, and the plurality of second ribs 184 crossing each other correspond to the reflective area RA. The plurality of first ribs 182 and the plurality of second ribs 184 may be formed of an insulating material.

The electric field, which is induced between the pixel and common electrodes 162 and 172, is distorted by the plurality of first ribs 182 and the plurality of second ribs 184 such that light may be transmitted and reflected along various viewing angles. In other words, the plurality of first ribs 182 and the plurality of second ribs 184 function as an electric field distorting unit.

As a result, the transflective VA mode LCD device 100 according to the present invention has a wide viewing angle.

Each of the plurality of first ribs 182 includes a plurality of rib units 182a in a first rib unit region UT. The first rib unit UT is repeatedly arranged. Similarly, each of the plurality of second ribs 184 includes a plurality of rib units 184a in a second rib unit region UR. The second rib unit UR is repeatedly arranged. To simplify explanation, the first rib unit UT and the second rib unit UR are arranged twice, respectively. The first rib unit UT including the first rib unit 182a is repeatedly arranged such that the plurality of first ribs 182 are formed in the transmissive area TA. Similarly, the second rib unit UR including the second rib unit 184a is repeatedly arranged such that the plurality of second ribs 184 are formed in the reflective area RA.

Figure 4:
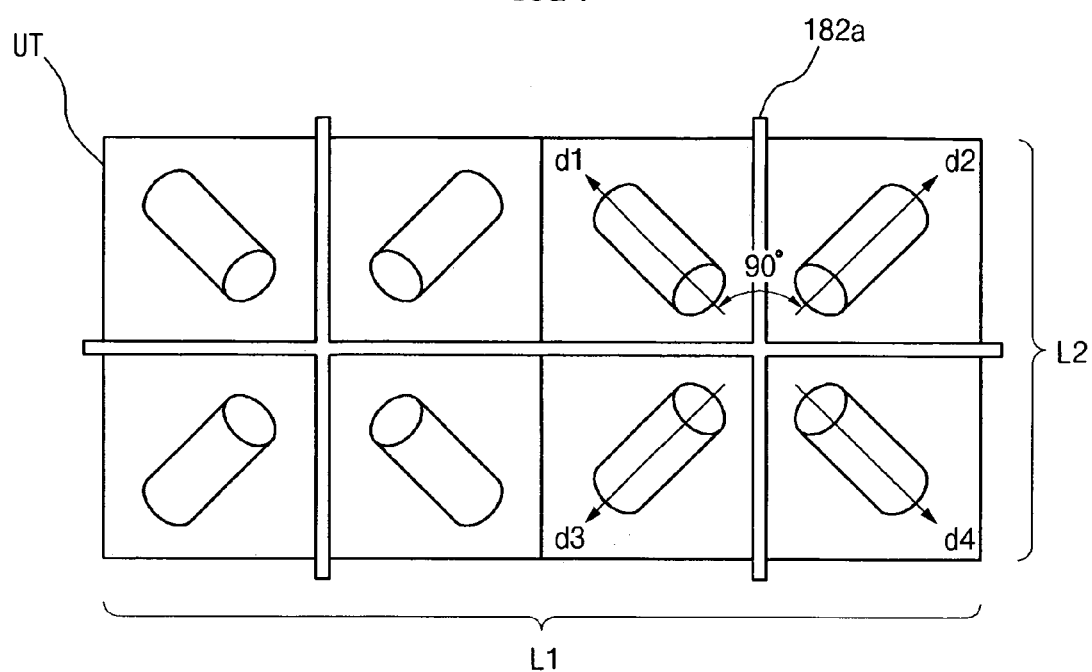
FIG. 4 is a schematic view showing a first rib unit region in a transmissive area of a transflective VA mode LCD device according to the present invention.
Figure 5:
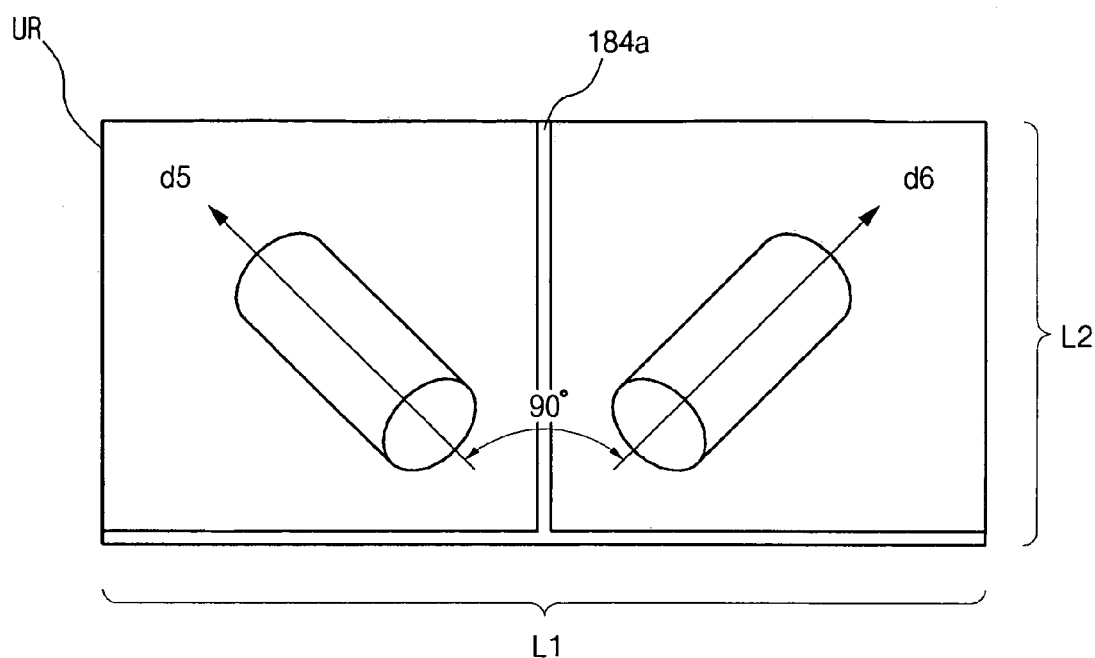
FIG. 5 is a schematic view showing a second rib unit region in a reflective area of a transflective VA mode LCD device according to the present invention.

The first rib unit region UT and the second rib unit region UR have different shapes and sizes from each other, as shown in FIGS. 4 and 5. FIG. 4 is a schematic view showing a first rib unit region in a transmissive area of a transflective VA mode LCD device according to the present invention, and FIG. 5 is a schematic view showing a second rib unit region in a reflective area of a transflective VA mode LCD device according to the present invention.

The VA mode LCD device has multiple domains to improve the viewing angle. Each of the multiple domains has the liquid crystal molecules of different tilted orientation from each other. The VA mode LCD device may have four domains. When the VA mode LCD device has one to three domains, there is less effect of improving the viewing angle than an effect in the four domains. In more domains than the four domains, there is decreasing of optical efficiency in the disclination between domains. Accordingly, the transflective VA mode LCD device having the four domains is explained in FIGS. 4 and 5.

As shown in FIG. 4, the first rib unit 182a includes two cross shapes in the transmissive area TA (of FIGS. 2 and 3). The two cross shapes are combined with each other in a row and formed in the first rib unit region UT. The first rib unit region UT has an area of L2 by L1. The liquid crystal molecules are arranged along four tilted orientations due to the first rib unit 182a such that orientational directors of the liquid crystal molecules have first to fourth directions d1, d2, d3 and d4. The first to fourth directions d1, d2, d3 and d4 may have different azimuthal angles of about 90 degrees from one another. As a result, the four domains are formed in the first rib unit region UT. Moreover, since the first rib unit region UT are arranged in a column direction in the transmissive area TA, the transmissive VA mode LCD device has the four domains in the transmissive area TA. Accordingly, the transmissive VA mode LCD device according to the present invention has the wide viewing angle in the transmissive mode.

As shown in FIG. 5, the second rib unit 184a of a reverse-T shape is formed in the second rib unit region UR in the reflective area RA (of FIGS. 2 and 3). Similarly, the second rib unit region UR has an area of L2 by L1. The liquid crystal molecules are arranged along two tilted orientations due to the second rib unit 182a of the reverse-T such that orientational directors of the liquid crystal molecules have fifth and sixth directions d5 and d6. The fifth and sixth directions d5 and d6 may have different azimuthal angles of about 90 degrees from each other. Accordingly, as considering only the second rib unit region UR, the second rib unit region UR has two domains.

However, since there is a mirror image effect in the reflective area RA, the viewing angle in the second rib unit region UR is improved as much as in a case of having four domains.

Figure 6:
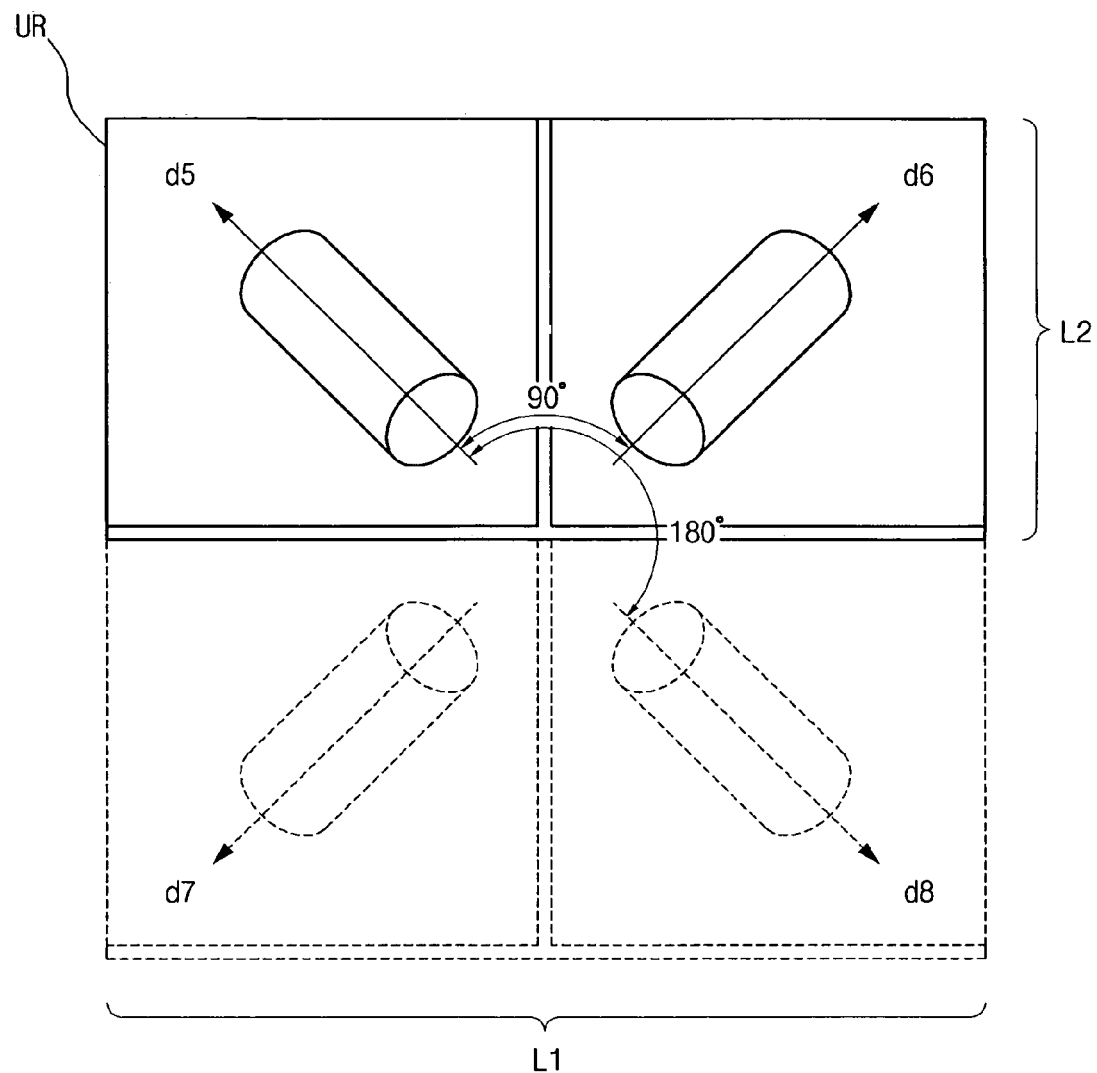
FIG. 6 is a schematic view explaining an optical effect depending on a second rib unit region in a reflective area of a transflective VA mode LCD device according to the present invention.

FIG. 6 is a schematic view explaining an optical effect depending on a second rib unit region in a reflective area of a transflective VA mode LCD device according to the present invention. The solid line shows the second rib unit 184a formed in the second rib unit region UR, and the dotted line shows the second rib unit 184a resulting from the mirror image effect.

As shown in FIG. 6, the orientational directors of the liquid crystal molecules in the second rib unit region UR including the second rib unit 184a of the reverse-T shape have the fifth and sixth directions d5 and d6. As mentioned above, the fifth and sixth directions d5 and d6 may have different azimuthal angle of about 90 degrees from each other. The light incident through the liquid crystal layer 180 (of FIG. 3) is reflected on the reflector 152 (of FIG. 2 and 3) such that the reflected light pass the liquid crystal layer 180 (of FIG. 3) and is emitted into the outside.

Considering the path of the reflected light, when the incident light has a certain phase, the reflected light on the reflector may pass through the incident path. It may be referred to as the mirror image effect. In other words, the liquid crystal layer 180 (of FIG. 3), which has the fifth director d5, has optical effects resulted from the fifth director d5 and a eighth director d8 due to the mirror image effect. The eight director d8 has an angle of 180 degrees from the fifth director d5. There is an effect of two domains with one domain due to the mirror image effect. Similarly, the liquid crystal layer 180 (of FIG. 3), which has the sixth director d6, has optical effects resulted from the fifth director d5 and a seventh director d7 due to the mirror image effect. The seventh director d7 has an angle of 180 degrees from the sixth director d6. There in an effect of two domains with one domain due to the mirror image effect.

Accordingly, the second rib unit region UR has an optical effect of the four domains such that the viewing angle is improved. The second rib unit 184 may have one of a T shape and an inclined-T shape.

Referring to FIGS. 4 and 5, the optical effect in the second rib unit region UR including the two domains is a same as the optical effect in the first rib unit region UT including the four domains such that the transflective VA mode LCD device according to the present invention has the optical effect resulting from the four domains throughout the transmissive and reflective areas TA and RA. Moreover, since there is less area of disclination between domains in the second rib unit region UR having two domains than the area of disclination between four domains, the optical effect and the aperture ratio are further improved. When the width of the disclination is assumed as "k", the area of disclination in the first rib unit region UT is equal to "(L1*k)+(2L2*k)". The area of disclination in the second rib unit region UR is equal to "(L1*k)+(L2*k). Accordingly, the disclination between the two domains is less than the disclination between the four domain. Thus, the two domains have as much aperture ratio as the four domains.

Since the transflective VA mode LCD device according to the present invention includes less domains in the reflective area RA than in the transmissive area TA without the deterioration of the optical effect, the luminance and the aperture ratio are improved. In more detail, the transmissive area TA includes the first rib unit 182 generating the four domains, and the reflective area RA includes the second rib unit 184 generating the two domains.

To distort the electric field, the ribs are formed on the common electrode as shown FIG. 3. However, a slit instead of the ribs may be formed on the common electrode 172 in another exemplary embodiment. Also, one of the ribs and the slit may formed on the pixel electrode 162.

It will be apparent to those skilled in the art that various modifications and variations can be made in the substrate for the liquid crystal display device and the method of fabricating the same of the present invention without departing from the sprit or scope of the invention. Thus, it is intended that the present invention covers the modifications and variations of this invention provided they come within the scope of the appended claims and their equivalents.

What is claimed is:

1. A liquid crystal display device, comprising:
   first and second substrates facing each other and including a plurality of pixel regions, each of the plurality of pixel regions including transmissive and reflective areas;
   a plurality of first electric field distorting units repeatedly arranged in the transmissive area, wherein each of the plurality of first electric field distorting units generates a first domain structure;
   a plurality of second electric field distorting units repeatedly arranged in the reflective area, wherein each of the plurality of second electric field distorting units generates a second domain structure having less domains than the first domain structure; and
   a liquid crystal layer interposed between the first and second substrates,
   wherein the plurality of second electric field distorting units have one of a reversed-T shape, a T shape and an inclined T shape.

2. The device according to claim 1, wherein the first domain structure includes four domains.

3. The device according to claim 2, wherein the second domain structure includes two domains.

4. The device according to claim 3, wherein liquid crystal molecules in the liquid crystal layer of the two domains have different orientational directors from each other about 90 degrees.

5. The device according to claim 1, wherein the plurality of first electric field distorting units have two cross shapes combined with each other.

6. The device according to claim 1, wherein the transmissive area includes a plurality of first regions, each including the first electric field distorting unit, and the reflective area includes a plurality of second regions, each including the second electric field distorting unit, and wherein the first region has a same area as the second region.

7. The device according to claim 6, wherein an area of disclination between domains in the second domain structure is less than an area of disclination between domains in the first domain structure.

8. The device according to claim 1, wherein each of the first and second electric field distorting units includes one of a rib shape and a slit shape.

9. The device according to claim 1, wherein each of the first and second electric field distorting units is formed on one of the first and second substrates.

10. The device according to claim 1, wherein the reflective area surrounds the transmissive area.

11. The device according to claim 1, wherein the plurality of first electric field distorting units and the plurality of second electric field distorting units are arranged in a column direction.

12. The device according to claim 1, further comprising:
gate and data lines on the first substrate and crossing each other to define the plurality of pixel regions;
a plurality of thin film transistors connected to the gate and data lines;
a plurality of reflectors corresponding to the reflective area;
a plurality of pixel electrodes connected to the plurality of thin film transistors and corresponding the transmissive area; and
a common electrode on the second substrate.

13. The device according to claim 12, wherein the plurality of reflectors are electrically connected to the plurality of pixel electrodes.

14. The device according to claim 12, further comprising a passivation layer interposed between the plurality of reflectors and the plurality of pixel electrodes.

* * * * *